(12) United States Patent
Costa Monteiro et al.

(10) Patent No.: US 12,055,262 B2
(45) Date of Patent: Aug. 6, 2024

(54) SYSTEM FOR PROTECTING COATED PIPES FOR ON-LAND AND SUBSEA PIPELINES AND THE METHOD FOR PROTECTING PIPES

(71) Applicants: PETROLEO BRASILEIRO S.A.-PETROBRAS, Rio de Janeiro (BR); IPT-Instituto de Pesquisas Tecnologicas do Estado de Sao Paulo S/A, Sao Paulo (BR)

(72) Inventors: Murilo Costa Monteiro, Rio de Janeiro (BR); Bertrando Ribeiro Rabelo, Rio de Janeiro (BR); Daniel De Almeida Pereira, Sao Paulo (BR); Mario Henrique Fernandes Batalha, Sao Paulo (BR); Leandro Aparecido Da Silva Albino, Sao Paulo (BR); Alessandro Guimaraes, Sao Paulo (BR)

(73) Assignees: IPT—INSTITUTO DE PESQUISAS TECHNOLOGICAS, Sao Paulo (BR); PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 218 days.

(21) Appl. No.: 17/628,592

(22) PCT Filed: Jul. 23, 2020

(86) PCT No.: PCT/BR2020/050283
§ 371 (c)(1),
(2) Date: Jan. 20, 2022

(87) PCT Pub. No.: WO2021/016691
PCT Pub. Date: Feb. 4, 2021

(65) Prior Publication Data
US 2022/0252203 A1    Aug. 11, 2022

(30) Foreign Application Priority Data

Jul. 31, 2019 (BR) .................. 102019015918-9

(51) Int. Cl.
*F16L 57/06* (2006.01)
*F16L 57/00* (2006.01)

(52) U.S. Cl.
CPC ............ *F16L 57/06* (2013.01); *F16L 57/005* (2013.01)

(58) Field of Classification Search
CPC .......... F16L 57/06; F16L 57/005; F16L 58/02
(Continued)

(56) References Cited

U.S. PATENT DOCUMENTS 199,349  A  *  1/1878  Caswell .................... F15D 1/04
                                                   285/55
2,022,189 A  * 11/1935  Engstrom .............. B65D 59/00
                                                   138/96 R (Continued)

FOREIGN PATENT DOCUMENTS

DE      202011103302 U1   12/2011
DE     20 2009 018 746 U1   3/2013
(Continued)

OTHER PUBLICATIONS

International Search Report for PCT International Application No. PCT/BR2020/050283, dated Oct. 27, 2020.

*Primary Examiner* — Patrick F Brinson
(74) *Attorney, Agent, or Firm* — RAPHAEL BELLUM PLLC (57) ABSTRACT

This invention encompasses a system and a method used in the petrochemical and mechanical engineering area, more specifically in the area of protecting pipes or similarly shaped objects against external or internal damage or wear, which comprises a protective system for the ends and the inside of coated pipes, using the coating itself and other additional devices. The system is comprised of a cup (1), spacer (2), coating (3), external ring (4), and cap (5) used in the production line of the pipe-coating process, using the external coating itself, preventing corrosion and mechanical damage at the ends/bevel, in the sandblasted area of the collar and internal surface, from storage and transport to the location where it will be used, and welding in the field or on the vessel.

9 Claims, 3 Drawing Sheets

(58) Field of Classification Search
USPC .............. 138/96 R, 96 T, 109, 110, 145, 146
See application file for complete search history.

(56) References Cited

U.S. PATENT DOCUMENTS

| | | | |
|---|---|---|---|
| 3,403,206 A * | 9/1968 | Joseph | B28B 21/94 |
| | | | 264/269 |
| 3,744,528 A | 7/1973 | Vestal | |
| 4,429,719 A | 2/1984 | Mosing | |
| 5,720,834 A | 2/1998 | Steele | |
| 7,487,801 B2 | 1/2009 | Zeyfang | |
| 7,727,593 B2 | 6/2010 | Zeyfang | |
| 2015/0308605 A1 * | 10/2015 | Aguilar | E21B 17/042 |
| | | | 138/96 T |

FOREIGN PATENT DOCUMENTS

| | | |
|---|---|---|
| EP | 3287683 A1 | 2/2018 |
| JP | 5244425 B2 | 4/2013 |
| JP | 6172963 B2 | 7/2017 |
| RU | 178 318 U1 | 3/2018 |
| RU | 2 659 010 C1 | 6/2018 |

* cited by examiner

SYSTEM FOR PROTECTING COATED PIPES FOR ON-LAND AND SUBSEA PIPELINES AND THE METHOD FOR PROTECTING PIPES

FIELD OF THE INVENTION

This invention is in the petrochemical and mechanical engineering area, more specifically related to a protective system for the ends and the inside of pipes coated against external or internal damage or wear, using the coating itself and other devices, such as a cup, a spacer, an external ring, and a cap, which protect the pipes during their storage and transport phase to the location where they will be used.

BACKGROUND OF THE INVENTION

The protection of pipes coated against corrosion and mechanical impacts has been proposed in various forms and manners over the years; some solutions focused on protecting the ends and/or bevel, while others focused on the collar (cutback), and others focused on protecting the interior of the pipes.

There is a need for a technique that integrates the solutions that can provide complete protection in an innovative way. This would eliminate the recurring losses caused by corrosion, reduce the cost of the sandblasting process in the field, reduce the time to prepare the surface of the collar, decrease the bottleneck in the release of seals, and mitigate environmental impacts by reducing the area that is sandblasted in the field.

The lack of a specialized technical solution results in rework that must be done during the process of transporting the pipe to the location where it will be used.

The solutions used to protect the ends only impact the area of the bevel, and the vast majority do not extend to protection for the collar, only protecting it against impact, having a small and restricted protected area.

The current practice of protecting the ends of pipes arises from technologies developed to combine protection with ease of use in solutions that can be easily applied, and that are strong enough to provide mechanical protection to the bevel. However, those solutions do not provide protection against damage to the collar and the coating, preventing corrosion and rework by areas that were previously sandblasted during the pipe coating process, which form the collar. Those areas are again submitted to a recovery process during the time between transport and storage, against corrosion and damage to the roughness profile of the collar, to be used in the field subsequent to this field recovery process.

Any rework that becomes necessary during transport, whether or not it is only the vessel, results in higher cost for the end user.

Other solutions are intended to protect the interior of the pipes against corrosion, preventing water from accumulating in their interior. Examples of such solutions are caps that have vented membranes, which allow water to flow out, preventing corrosion in the interior, but they do not protect external areas such as the collar and the bevel against corrosion.

Solutions to protect the collar were developed for protection during the coating process, in which the pipe receives layers of anti-corrosive materials, and some describe protection such as sheets, which have chemical properties intended to help protect the area, contracting when exposed to heat and expanding when in contact with cold.

Protecting the area of the collar during the coating application process is done by placing a type of film that wraps around the area to be protected, receiving the coating on top, allowing the coating to be removed at the end of the process, forming the collar. This is an inefficient solution, as the film leaves residue on the sandblasted area of the collar, often resulting in the need to sand the region.

Another solution presented is the use of a nozzle to protect uncoated pipes used during storage, transport, and hoisting up to their coupling in hydraulic and pneumatic components, for example. The protection comprises a protective cap for pipe ends, containing a sleeve with a central box to receive the end of the pipe and a detachable ring. That ring is used to close the existing space between the end of the pipe and the coupled equipment, protecting against the entry of impurities in that area. While the solution contains a sleeve for lengthwise protection of the pipe and a cap for protection of the bevel, the pipes do not present a collar as they are not coated pipes. That solution provides mechanical protection, not protection against corrosion, and thus it is outside the range of protective application for pipes used in pipelines.

The three-layer external anti-corrosive coating of steel pipes for on-land and subsea pipelines is applied by coaters with plants established in Brazil, in accordance with Brazilian standards ABNT NBR 15221—1—Steel Pipes—External Anti-Corrosive Coating—Part 1: Three-layer polyethylene; and ABNT NBR 15221-2—Steel Pipes—External Anti-Corrosive Coating—Part 2: Three-layer polypropylene.

The standard used abroad is ISO 21809-1—Petroleum and natural gas industries—External coating for buried or submerged pipelines used in pipeline transportation systems—Part 1: Polyolefin coatings (3-layer PE and 3-layer PP).

The production line for this coating process comprises fifteen phases, in which each phase must precede the subsequent phase.

In Phase 1, Cleaning and Pre-Heating, the cleaning seeks to ensure that the external surface of the pipes is free of grease, oil, or other materials that might impact the quality of the final coating, and that contamination by soluble salts is within the limit established in the applicable standard. The purpose of pre-heating, if it is necessary, is to remove any wet surface material, and it must be done at a temperature of 3° C. above the dew point, but below 100° C.

Phase 2, Sandblasting, is done in two stages: in the first, the purpose of the sandblasting is to clean the surface using round grit, or a mixture of round and angular grit. The second only uses angular grit, and its purpose is to roughen the profile, also called the anchoring profile. The roughness profile, which must be within the range of 60 to 100 µm, seeks to ensure adherence of the epoxy resin, and it is one of the determining factors for the efficacy of the anti-corrosive protection system. In general, the coaters are not using a bevel protector during this phase, although it is recommended they do so in order to prevent the abrasive blasting from reaching this area and the friction in movement of the pipes that are in line; this lack of protection causes a great amount of damage to the bevel.

Phase 3, Post-Sandblasting Inspection, consists of visual inspection, verification of the cleaning, and measurement of the roughness of the sandblasted surface. The approved pipes continue on to Phase 4, and those that are not approved are separated out.

Phase 4, Coupling and Alignment, consists of placing the aligned pipes (profiled) into a continuous line for coating. In this phase, cylindrical objects called couplers (couplings or small hoses) are placed between the pipes. Their purpose is to keep the ends of the pipes aligned during the movement process. This is done by rollers that keep turning the pipes as they advance, which is required by the lateral extrusion process.

Phase 5, Heating, consists of an electromagnetic induction heating oven that will heat the external surface of the pipes to a temperature around 250° C., not to exceed 275° C. It may not be heated by flame, and the effective heating temperature depends on the recommendations of the powdered epoxy manufacturer. In addition to being heated, the pipe is also polarized, with polarity that is inverse to that of the powdered epoxy.

Phase 6, Epoxy Application, consists of a compartment with several precisely positioned electrostatic pistols that will apply the powdered epoxy to the pipe's heated and polarized surface, in order to guarantee an adequate range of thickness. The epoxy is attracted by the inverse polarity, printed on the external surface of the pipe, and cured thermally due to the temperature induced by the electromagnetic process.

Phase 7, Extrusion of the Copolymeric Adhesive, consists of applying the copolymeric adhesive film over the epoxy layer by still-hot extrusion.

Phase 8, Polyethylene or Polypropylene Extrusion, consists of applying the polyethylene or polypropylene film over the adhesive, thus completing the three-layer coating.

Phase 9, Cutting and Separation, consists of cutting the coating at the end of the pipe so that it ceases to be a continuous line and returns to being an individual pipe. This cut is done manually by an operator using a trowel, because in this phase the coating is hot and malleable, thus cutting it is easy and fast.

Phase 10, Cooling, consists of a line of several water springlers for cooling. At the end of this line, the anti-corrosive external coating applied must be at a maximum temperature of 90° C.

Phase 11, Inspection of Discontinuity in the Coating (holiday detector), consists of applying a high-voltage capacity differential, close to 24 kV, to detect any failures in the coating. The pipes that present failures during this phase will be separated out. The approved pipes continue on to the next phase.

Phase 12, Inspection of the Coating. In this phase the coating applied is inspected visually, and if approved goes on to Phase 13.

Phase 13, Creation of the Collar (cutback), consists of brushing the coating applied at the ends of the pipe in order to form an uncoated area that varies from 100 to 200 mm wide. This collar has two ends: the first is so the welding does not damage the coating due to the input of heat generated and any splashes; and the second is to be the area for coupling the beveler, when the bevel is made in the field or on the vessel, for coupling the automated welding device and the ultrasound inspection equipment used to inspect the weld done in the field or on the vessel. In this phase, at the client's request, the collar is machined in order to leave an apparent range of the first layer, the epoxy. This exposed range (tail) is to prevent the coating in this region from detaching when the pipes are stored in the open, in seaside locations or tropical areas with relatively high humidity. Once the collar is created, and if the tail is specified, it moves to the next phase.

Phase 14, Final Inspection, consists of inspecting the collar and the respective tail of the bevel. If approved, the pipe goes on to the last phase.

Phase 15, Placement of Protective Devices on the Ends, which is done when requested by the client, sends the pipe for storage and subsequent dispatch.

Note that in the current manufacturing process, the pipe is fully coated and at the end of the process the collar (cutback) is brushed, creating unrecyclable waste and making the surface smoother, which alters the necessary roughness profile obtained during the sandblasting operation.

The Brazilian and foreign standards mentioned above do not specify the protective devices for the ends (collar and bevel) and the interior of the pipes. It is at the criteria of the users to define what to use, as the current solutions have proven to be ineffective and incomplete from the technical point of view.

Although the ABNT standard cites an anti-corrosive protector for the surface of the collar and bevel projected for just 30 days of duration and easy removal, the majority of companies demand a solution for this problem due to recurring losses due to corrosion, damages during transport, handling, and productivity losses in the construction and assembly process of these pipes.

Furthermore, subsea pipe installers (submerged pipes) purchase pipes without a bevel, that is, they prefer to create them on the vessel, although any activity performed in the field or on the vessel is much more expensive than at the factory.

Storage of coated pipes for a prolonged period, particularly in a tropical or marine environment, can lead to damage to the ends and to the uncoated internal surface, due to the accumulation of dust, detritus, and moisture. In the most serious situations, these problems can compromise the structural integrity of the pipe, leading to it being scrapped, or increasing the amount of rework at the time of its assembly and installation, thus reducing productivity considering daily costs, such as, for example, in an offshore operation to launch subsea pipelines.

STATE OF THE ART

Various types of devices have been developed to protect the ends of pipes, preventing their degradation by impact, moisture, detritus, and corrosion. The fact is that depending on the condition of degradation, the structural integrity of the pipe may be compromised, leading to it being scrapped, or at least increasing the need for rework at the time of its assembly and installation, thus reducing productivity and increasing the cost of the process.

Within this scope, protecting coated pipes against corrosion and mechanical impacts has been proposed in various ways and manners over the years, with some solutions focused on protecting the ends and/or the bevel, and others focused on the collar (cutback), and others focused on protecting the interior of the pipes, such that the need for a technology that combines the solutions was defined, leading to complete and integrated protection, eliminating recurring losses due to corrosion, reducing the cost of the sandblasting process in the field, reducing the surface preparation time of the collar, decreasing the bottleneck in the release of seals in the field, and mitigating the environmental impact by reducing the sandblasted area in the field, and eliminating the rework that has to be done during the process of transporting the pipe to the site where it will be used.

Therefore, the solutions intended to protect the ends only impact the area of the bevel, and the vast majority do not extend protection to the collar, only protecting it against impact, thus there is a small and restricted protected area.

The current practice of protecting the ends of pipes combines technologies developed to combine protection with ease of use, so that the solutions can be easily applied and to present sufficient resistance to provide mechanical protection for the bevel; however, those solutions do not result in protection against damage to the collar and to the coating, preventing corrosion and avoiding rework on the areas that were previously sandblasted during the pipe coating process, which form the collar. Those areas undergo a damage recovery process during the time that transpires between transport and storage, against corrosion, and the roughness profile of the collar when used in the field, and later they are again submitted to that recovery process in the field, resulting in a higher cost for the end user.

Some adaptations were made to overcome some of the obstacles that the solutions listed above show. However, despite resolving some of them, the majority are palliative in nature and do not provide complete protection.

As an example of such adaptations, there is the bevel protector (end of the pipe) that consists of a metal ring that increases mechanical protection at the end of the pipe (bevel), which may be used in combination with a polymer plug; however, it does not protect the area of the cutback and it may accumulate liquid in its structure.

Another palliative solution is the use of caps or plugs with permeable sections, such as patents DE 202009018746 (Covering device for a tube and the tube with such a covering device), U.S. Pat. No. 7,487,801 (Cap and plug for masking or shipping), RU2659010 (Polymer end cap, method of its manufacture, method of protection of hollow cylindrical product and product with an installed cap), and U.S. Pat. No. 7,727,593 (Cap and plug masking or shipping), which, however, do not present mechanical protection against impacts to the end, and may allow moisture to enter inside the pipe, which may cause corrosion.

A complement of these solutions is placing sacks of silicone inside the pipes to absorb moisture, or to apply polymer films to the surface of the pipe. Polymer films U.S. Pat. No. 5,720,834 (Method for covering a pipeline by wrapping) and JP5244425 (Propylene resin film for surface protection), have the advantage of protecting the cutback during application of the epoxy and coating, however they are unable to maintain surface roughness of the area that is required in the process.

This occurs because during removal of the film at the end of the coating process, part of the adhesive layer remains on the surface, which compromises its future use. In addition, the complementary method for guaranteeing total removal of the adhesive is the use of brushing or a chemical substance that may lead to an inadequate condition in which the cutback was presented before placement of the film.

The document of North American patent U.S. Pat. No. 7,727,593 B2 (Cap and plug for masking or shipping), reveals a cap to be used at the ends of the pipe, with one end open and the other closed, and an elongated tubular body. The invention is thus intended to protect against impact during storage or transport; however, it does not provide any protection from losses caused by corrosion, or even protection of the collar/bevel in order to main its characteristics after production.

Another document that may be mentioned is Japanese patent JP 6172963 B2 (Protection cap), which describes a removeable protective cap to be attached to the end of the pipe. In this case, the document is related to internal protection of the pipes against corrosion, preventing accumulation of water in its interior; however, there is no protection related to external losses due to corrosion, or even protection of the collar/bevel in order to maintain its characteristics after production.

The document of Russian patent RU 178318 (Protective plug for pipes), which reveals a protective cap for the internal surface and ends of the steel pipe, describing a steel ring that increases the mechanical protection of the ends of the pipe, may also be used in combination with a polymer plug. In this case, the document is related to protection of the bevel, of the ends of the pipe; however, it does not protect against losses due to external corrosion, nor does it protect the collar in order to maintain its characteristics after production.

Another mentioned document is North American patent U.S. Pat. No. 7,487,801 (Cap and plug for masking or shipping), which describes a cap used to seal the ends of a pipe, which is presented with permeable elements; however, it does not protect against losses due to external corrosion, nor does it protect the collar in order to maintain its characteristics after production.

North American patent U.S. Pat. No. 5,720,834 (Method for covering a pipeline by wrapping) describes a polymer adhesive used on the external part, which, however, is unable to maintain the surface roughness of the region as required in the process, which occurs during removal of the adhesive at the end of the coating process, because part of the adhesive layer remains on the surface, which harms its use in the future. Furthermore, it does not provide any type of protection to the ends and/or bevel, nor does it protect against corrosion on the inside of the pipe.

Although there are some products related to protection of metal pipes, no technology was found that allows concomitant protection of the cutback, the bevel, and sealing of the pipe, nor was any technology found in which the solution was applied during manufacture or coating of the pipe, or that tries to preserve the surface quality of the pipe in the area of the cutback. All solutions presented currently start from creation of the cutback, which leads to the need to eliminate the roughness profile in that area for posterior protection.

In light of the foregoing, it should be noted that no means of protecting the ends/bevel of coated pipes are known of in the state of the art that work in a way that prevents corrosion and resists mechanical impact, using the coating itself as a protective mechanism. The existing technologies describe forms of partial protection for the described problem, and are not complementary. In general, the documents describe deficient solutions that compromise the process of protecting coated pipes, as they do not present synergy with the pipe coating process, and they are not applicable throughout the entire process, between coating, storage, transport, and their use in the field.

BRIEF DESCRIPTION OF THE INVENTION

The present invention refers to a system developed to protect coated pipes, preventing corrosion and mechanical damage to the ends/bevel in the sandblasted area of the collar and the internal surface, from storage to welding in the field or on the vessel, using the external coating itself and components specifically developed for this purpose.

The system developed, which is called SPT, preferentially includes steel pipes coated externally with an external diameter varying from 4 to 32 inches, and with thickness varying from 6 to 51 mm (¼ to 2 inches). For this objective, the system is comprised of the following elements: a cup, spacer, external coating, an external ring and a cap, such that all components will be inserted using the coating method. The mentioned system promotes increased useful life of the coated pipes when they are stored in the environment (open air), as well as decreased assembly time, resulting in savings in construction costs. This being the case, the technical advantages obtained have direct or indirect effects on the manufacturing process, storage, and assembly, eliminating recurring losses caused by corrosion during storage, reducing the cost of the sandblasting process in the field, eliminating the brushing operation of the collar in the factory, eliminating the operation of preparing the apparent range of the primary layer (tail) at the factory, reducing the time to prepare the surface of the collar, consequently decreasing the bottleneck in releasing seals in the field, and mitigating the environmental impact by reducing the sandblasted area in the field or on the vessel.

BRIEF DESCRIPTION OF THE FIGURES

The present invention will be described below referencing its typical embodiments and also referencing the attached designs.

DETAILED DESCRIPTION OF THE INVENTION

The present invention, used in externally coated steel pipes in multi-layer systems for anti-corrosive protection and/or thermal isolation, preferably with an external diameter varying from 4 to 32 inches and with thicknesses varying from 6 to 51 mm (¼ to 2 inches), seeks to obtain gains associated with the useful life of the coated pipes when they are stored in the environment (open air), in addition to decreasing the assembly time, resulting in savings in the cost of construction, especially those costs related to the manufacturing process, storage, and assembly such as: (a) elimination of recurring losses due to corrosion in stored pipes; (b) reduction of the cost of sandblasting in the field; (c) elimination of the collar-brushing operation at the factory; (d) elimination of the operation of preparing an apparent range of the first layer (tail) at the factory; (e) reduction of the time to prepare the surface of the collar, decreasing the bottleneck in the release of seals in the field; and (f) mitigation of the environmental impact by reducing the area that is sandblasted in the field or on the vessel.

The present invention refers to a system and method developed to protect coated pipes, preventing corrosion and mechanical damage on the ends/bevel, in the sandblasted area of the collar and internal surface, from storage to welding in the field or on the vessel, using the external coating itself and components specifically developed for that purpose.

The mentioned system for protection of coated pipes for on-land and subsea pipelines allows the coating itself to be used as protection, and maintenance of the quality and surface roughness of the area of the collar (cutback) is obtained by means of its masking during the pipe-coating phase. Thus, the collar (cutback) is only exposed at the time of pipe assembly in the field or on the vessel.

The fact that the protection is integrated into the pipe coating procedure improves the ability to seal the solution and allows the profile present on the end of the pipe (bevel) to be done at the pipe manufacturer's plants, making this process more economical and more traceable if compared to the current procedure, wherein this step is done in the field due to the inability of the current protective systems to guarantee the profile and the surface quality of the end of the pipe.

Furthermore, brushing the coating in the factory can be eliminated, in order to maintain the roughness profile in the entire area until the time of assembly, thus avoiding the need to repeat the sandblasting operation in this area when in the field, so that the assembly that is comprised of the cup (1), spacer (2), coating (3), external ring (4), and cap (5) acts to prevent mechanical damage and corrosion on the ends and on the internal surface of the pipe.

This invention therefore provides a system to protect pipes coated against corrosion internally and externally, protecting the ends/bevel against mechanical impacts, and that is capable of maintaining roughness in the area of the collar throughout the entire pipe coating process until its use in the field.

The mentioned protective system is comprised of the following elements that interact amongst each other: a cup (1), a spacer (2), the external coating (3), an external ring (4), and a cap (5), all of which components are inserted throughout the coating process as it is currently performed, which was adapted, including with the insertion of new steps, in accordance with the method that is the scope of the present invention.

The mentioned method of protecting pipes comprises the steps of:
 a) Attaching a protective cup (1) to the end of the pipe (6.1);
 b) Applying a coating to the pipe (3.1);
 c) Cutting the coating (3.1);
 d) Folding the coating envelope (3.2) over the cup (1);
 e) Attaching an external ring (4) to the cup (1) and on the folded part of the coating over the cup (1); and
 f) Attaching a cap (5) to the cup (1).

The mentioned method may comprise an additional step of pre-heating, following the step of cleaning the pipe and prior to step a). This pre-heating step should be done at a temperature of 3° C. above the dew point and below 100° C.

This method may also comprise an additional sandblasting step, following the cleaning and/or pre-heating step, and prior to step a).

The sandblasting step is done in two sub-steps, in which the first sub-step is configured in order to clean the surface, and the second sub-step is configured to create a roughness profile at the end of the pipe that is between 60 and 100 µm.

The first sub-step preferentially uses round grit or a mixture of round and angular grit, and the second sub-step uses only angular grit.

The mentioned method may also comprise an additional step of coupling and alignment of multiple pipes (6.1) prior to step a), as well as an additional step of heating the pipes (6.1) between 200° C. and 275° C. prior to step a), and the step of heating the pipes is done by electromagnetic induction.

The mentioned method may further comprise an additional step of applying a resin on the pipe so that the electromagnetic induction also polarizes the pipe with a polarity that is inverse to that of the resin.

Step b) must be done by extrusion of polymers, preferentially by means of co-extrusion, and more preferentially using polyethylene and polypropylene polymers.

Step d) is done by means of the coating envelope (3), by means of folding it at a 90° C. to 180° C. angle over the cup (1).

The method may further comprise an additional cooling step subsequent to step d), and an additional step of internal drying of the pipe prior to step f).

The spacer (2) used during pipe coating, as an accessory item, should be reused in the coating process, noting that the coating (3) is used to protect the collar (cutback). Since the system is constructed throughout the coating method, the construction specifics in each phase will be pointed out, which contain adaptations related to use of the mentioned system:

In Phase 2, Sandblasting, it is also necessary to use a closed bevel protector to prevent the bevel from being sandblasted, as it will be precision machined, and also to prevent grit from getting inside the pipe. This protector is reusable and should be removed after the pipe has been sandblasted.

After Phase 3, Post-Sandblasting Inspection, a cup (1) is placed at each end of the pipe.

Next, in Phase 4, Coupling and Alignment, the spacer (2) is placed between the anterior pipe and the posterior pipe, replacing the coupler. These operations, both placement of the cup (1) in Phase 3, as well as the spacer (2), may be done manually or it may be automated.

The process continues normally until Phase 9, Cut and Separation, when the coating is cut, the spacer (2) is removed and returns to the production line in Phase 4.

A new phase is added, called Coating Folding, which consists of folding the coating envelope (3) at an angle that is between 90 to 180° C., and placing the external ring (4). This phase may be performed after Phase 9 (Cutting and Separation) or in Phase 12 (Inspection of the Coating), at the criteria of the coater. Note that to perform it after Phase 9, the coater must alter its physical layout, so that the distance between the cutting location is increased, Phase 9, and the start of Cooling in Phase 10.

In Phase 12, Inspection of the Coating, the pipe is dry inside, then the cap (5) is placed, and air is suctioned from inside the pipe through a safety valve (5.1), so that the pressure inside the pipe is lower than pressure outside the pipe. This pressure differential should be defined as a function of the diameter of the pipe, serving to maintain the cap's seal and prevent it from being expelled when the pressure inside is greater than the pressure outside. In this phase, Inspection of the Coating, the pipe is dry on the inside, the coating envelope is folded at an angle from 90 to 180° C., and the external ring (4) and the cap (5) will be placed, completing the process.

Phase 13, Creation of the Collar and of the Tail, is eliminated, while Phases 14 (Final Inspection) and 15 (Placement of the Devices) are performed.

Figure 1:
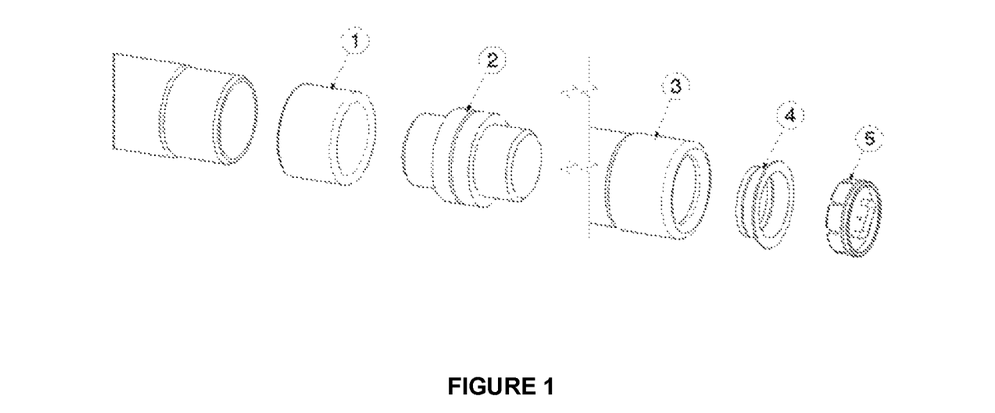
FIG. 1 is a graphic representation in exploded perspective of the mentioned pipe protection system that comprises the cup (1), spacer (2), external coating (3), external ring (4) and cap (5)
Figure 2:
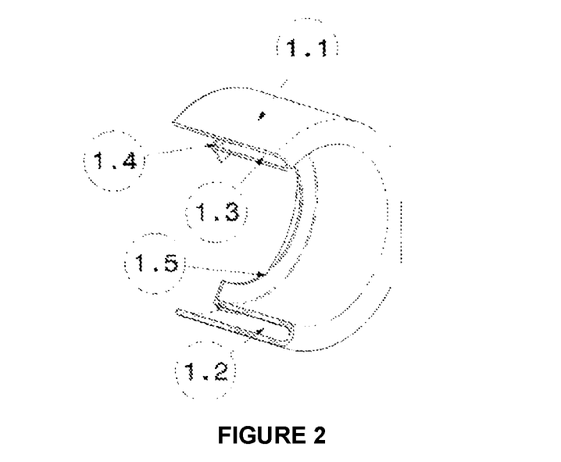
FIG. 2 is a graphic representation in isometric perspective of the cup (1), in accordance with a preferential configuration of the present invention.

The components of the system to protect coated pipes for on-land and subsea pipelines comprise:

The cup (1), comprised of five main parts, as detailed in FIG. 2, has: an external tab (1.1), an internal surface of the external tab (1.2), an internal surface of the internal tab (1.3), sealing element (1.4), and a pressure ring (1.5). The cup (1) is mechanically connected to the pipe between the external portion of the pipe (6.1) and the coating (3).

The purpose of the cup (1) is to mask the area of the pipe that will form the collar (cutback) and protect the bevel during the process of coating and transport. Its material may be metallic, polymeric, or composite.

The co-polymeric adhesive used in the pipe coating process must adhere to the external surface of the external tab (1.1), and the internal diameter of the external tab (1.2) must be approximately equal to the external diameter of the pipe, with tolerance that allows it to be slotted in by intervention, so that it can be positioned without free movement during the coating process.

The internal surface of the internal tab (1.3) has a sealing element (1.4) formed of one or more rings of polymeric or rubber material, preferentially neoprene, to prevent water from entering its interior during the cooling process.

The length of the external tab (1.1) varies from 100 to 200 mm, and the length of the internal tab (1.3) varies from 50 to 200 mm, and the thickness of the wall of the cup (1) is less than or equal to 3 mm.

The pressure ring (1.5) is made of metal or composite material, and it has a device to pressure the sealing element (1.4) against the internal wall of the pipe in order to ensure sealing during the cooling process and for its entire useful life. The pressure ring (1.5) also serves as a stopper for the cap (5) shown in FIG. 6.

Figure 3:
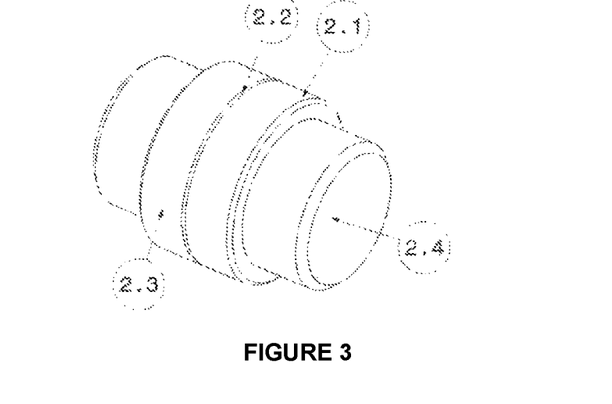
FIG. 3 is a graphic representation in isometric perspective of the spacer (2), in accordance with a preferential configuration of the present invention.

The function of the spacer (2), shown in FIG. 3, made of cast metal material, folded or welded, is to maintain adequate spacing and alignment between the pipes during coating. Its external diameter (2.1) is equal to the external diameter of the pipe to be coated, with tolerance of up to ±10 mm.

With a chamfer (2.2) for cutting the coating, shown in FIG. 3, its surface (2.3) is rectified or machined with a degree of roughness that is lower than 20 µm, in order not to allow adhesion of the first layer of epoxy.

The spacer (2) is hollow (2.4) so that it is light, easy to manipulate, and to allow cooling water to enter into the pipe.

Figure 4:
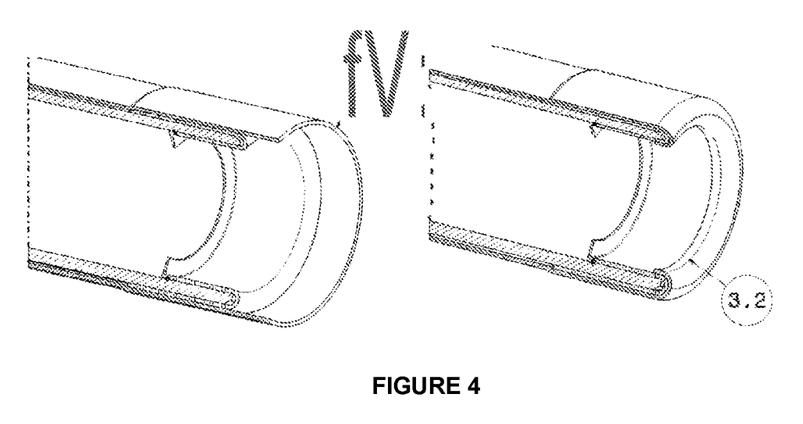
FIG. 4 is a graphic representation in isometric perspective of the external coating (3), in accordance with a preferential configuration of the present invention.

The purpose of the coating (3) shown in FIG. 4 is to protect the collar (cutback), adhering to the external surface of the cup (1), and its envelope (3.1) will be folded (3.2) at an angle varying from 90° C. to 180° C. in order to prevent it from opening after removal of the spacer.

Figure 5:
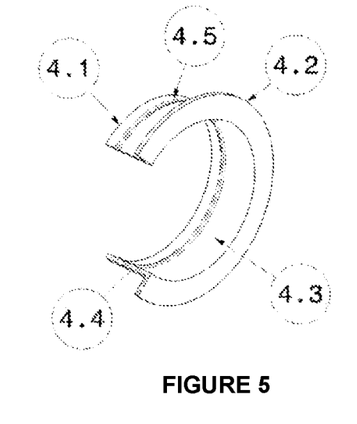
FIG. 5 is a graphic representation in isometric perspective of the external ring (4), in accordance with a preferential configuration of the present invention.

The purpose of the external ring (4) shown in FIG. 5, used after removal of the spacer (2), is to affix the folded coating (3.2), creating a tab to protect the bevel (4.2). Its external diameter (4.5) is variable so that it can be slotted in by intervention in the internal diameter of the cup (1).

Figure 6:
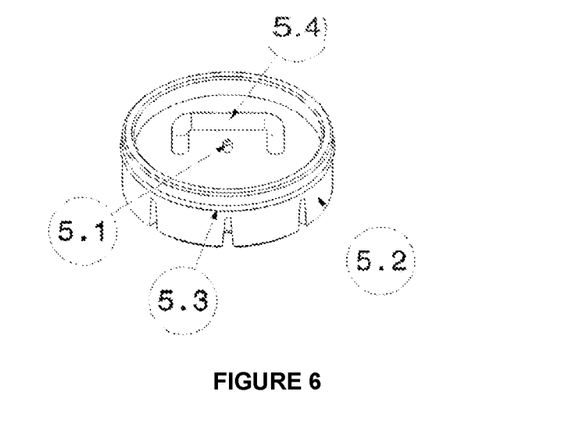
FIG. 6 is a graphic representation in isometric perspective of the cap (5), in accordance with a preferential configuration of the present invention.

The purpose of the cap (5) shown in FIG. 6 is to protect the inside of the pipe, and it is slotted into the component (1.5) of the cup (1). It is made of polymeric material or from a metal/polymer combination. The cap (5) has a safety relief valve (5.1), made of tin or stainless steel, attached to the surface of the cap (4) by a screw or intervention, and it is used for the pressure range seeking to alleviate the pressure inside the pipe when necessary.

The external diameter (5.2) of the cap is equal to the internal diameter of the cup (1), and the mentioned cap also has a sealing system (5.3) to impede entry of any external means of oxidation, and furthermore, it has a handle (5.4) with a system to rapidly open and close the cap when necessary.

Once the system for protecting coated pipes for on-land and subsea pipelines is assembled, the pipes are sent for use in the field, and the coating is cut by automation at an angle of less than 30° C., so that the system is removed quickly and precisely, either manually or by automation.

Figure 7:
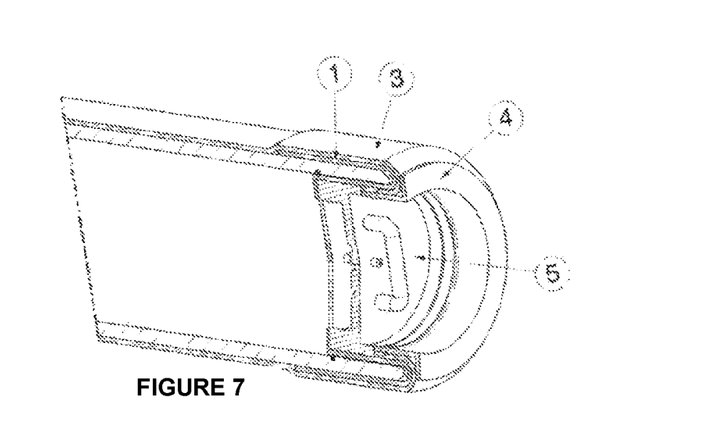
FIG. 7 is a graphic representation in isometric perspective of the pipe protection system assembled on a pipe.

FIG. 7 shows a view of the system to protect coated pipes for on-land and subsea pipelines assembled at the end of the assembly process, and FIG. 7 shows the mentioned system in an exploded perspective of the pipe after cutting and removing it.

Figure 8:
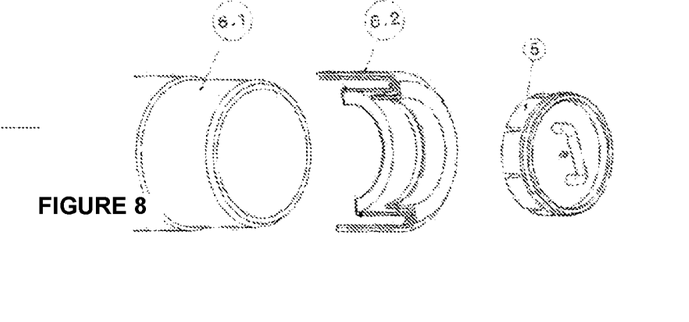
FIG. 8 is a graphic representation in exploded perspective of the pipe after cutting and removal from the mentioned system.

FIG. 8 details the pipe (6.1) prepared to be coupled and welded in the field or on the vessel after the coating is cut, and the entire assembly (6.2) relative to the pipe protection system is removed from the pipe after cutting and removing the cap (5).

The invention claimed is:

1. A system for protecting pipes for on-land or subsea pipelines, the pipe comprising an internal portion and an external portion, the external portion being covered by a coating, wherein the system also comprises:
   a cup (1);
   wherein the cup (1) is mechanically connected to an end of the pipe between the external portion of the pipe (6.1) and the coating (3).

2. The system of claim 1, wherein the cup (1) comprises:
   an internal surface of an external tab (1.2),
   an internal surface of an internal tab (1.3);
      wherein the internal surface of the internal tab (1.3) of the cup (1) is mechanically connected to the internal portion of the pipe and the internal surface of the external tab (1.2) of the cup (1) is mechanically connected to the coating.

3. The system of claim 2, wherein the cup (1) further comprises an external tab (1.1);
   wherein the internal surface of the internal tab (1.3) is connected to the external tab (1.1) in a part of the connection in the shape of a U, as an adjacent space between them; and
   wherein the pipe is positioned between the internal surface of the external tab (1.2) and the internal surface of the internal tab (1.3).

4. The system of claim 2 further comprising:
   a sealing element (1.4) on one end of the internal surface of the internal tab (1.3).

5. The system of claim 3 further comprising:
   an external ring (4);
   wherein the coating covers the external tab (1.1) of the cup (1) and is partially folded over the internal surface of the internal tab (1.3); and
   wherein the external ring (4) is configured to affix the portion of the folded coating over the cup (1).

6. The system of claim 5 further comprising a cap (5);
   the cap being mechanically connected to the external ring (3) and to the cup (1); and
   wherein the cap (5) is configured to seal the internal portion of the pipe.

7. The system of claim 6, wherein the cup includes a pressure ring (1.5), acting as a stopper between the cap (5) and the cup (1).

8. The system of claim 6, wherein the cap (5) comprises a safety valve (5.1) to relieve pressure from inside the pipe.

9. The system of claim 1 further comprising:
   a spacer (2);
   wherein the spacer (2) connects mechanically and aligns two consecutive pipes in a production line or in storage, with adequate spacing between the pipes to allow cutting relative to folding of an envelope of the coating (3).

* * * * *